Patented July 18, 1944

2,353,686

UNITED STATES PATENT OFFICE 2,353,686

SOAP AND PROCESS FOR ITS MANUFACTURE

Robert Brown, New York, N. Y., assignor to Brownmil Laboratories, Inc., Brooklyn, N. Y., a corporation of New York No Drawing. Application July 8, 1940, Serial No. 344,412

13 Claims. (Cl. 252—368)

The present invention relates to soap and its manufacture, and more particularly to a new and improved soap containing the oily matter from fresh or waste coffee material, and to the method of production of such soap.

It is the general object of the invention to provide a new and improved soap having incorporated therein, in partially or completely saponified condition, the oils contained in fully roasted, partly roasted or green coffee bean material, together with the fibrous matter.

It is a more specific object of the invention to provide a toilet or laundry soap characterized by an unusually heavy lather having exceptionally good detergent qualities and possessing also a bleaching or whitening action without any deleterious effect upon the skin or upon goods being laundered.

It is a further object of the invention to provide a soap which, in addition to its excellent cleansing properties leaves the skin in a soft and smooth condition.

It is also an object of the invention to provide an improved soap which can be manufactured at a very low cost, and in particular, one which can be produced by a cold process.

According to the invention, the oils of coffee beans, but preferably the whole beans, including the fibrous and other matter normally contained in the beans are incorporated in a mixture containing fatty or oily substances, the mixture being thereafter saponified, either in the cold or at elevated temperatures. I have found that the incorporation of about 20–35% of ground coffee bean material in a soap stock contributes very valuable properties to the final product in addition to reducing considerably the cost of manufacture. In particular, the saponified coffee oils appear to contribute to the production of an abundant, yet heavy lather, which has superior cleansing properties. The soap has also been found to have a very decided bleaching or whitening action; just what this is due to is not entirely clear, but it seems to be due, at least in large part, to the water-soluble components of the coffee beans. Also, the fibrous matter of the coffee is, in accordance with the invention, ground to a substantially colloidal condition, and these fibrous particles act as a gentle abrasive which digs out or loosens the dirt and other matter, yet is so soft that it does not injure the skin. These minute fibrous particles, suspended in the lather, appear to enter the pores of fabrics and force out dust, dirt and other matter contained therein, but are themselves readily removed in the rinse water. When used on the hands, the soap not only rapidly removes dirt, grease and the like, but removes also non-pathologic redness of the skin and leaves it soft and white.

The coffee matter employed in the present invention may be of various kinds. In particular, I have found that waste coffee grounds are suitable for use in my process and thus provide a material whose only cost is the cost of collecting it from restaurants, hotels, etc. In fact, restaurateurs, hotel keepers, etc., will find it to their advantage to dispose of waste coffee grounds in specially provided containers as they can then keep their other waste matter uncontaminated with coffee grounds which make such waste matter unpalatable to swine and other farm animals to which it is commonly fed. The preparation of coffee infusions leaves most of the coffee oils in the grounds, and these oils are utilized in my process for the manufacture of soap.

In place of coffee grounds, other waste coffee material, such as spoiled or rancid coffee or inferior grades of coffee, either fully roasted, partly roasted, or green may be employed. Green beans are ordinarily not very satisfactory, as they are very difficult to grind to the fine condition and their oils are not so readily available, but where a light-colored soap is required, either the green beans or lightly roasted beans can be employed; if desired, extracts of the coffee oils (both saponifiable and unsaponifiable) obtained with organic solvents may be used, especially where transparent soaps are desired, but these will necessarily be more expensive to manufacture.

About 15% of the coffee is constituted of fats and oils extractable with carbon tetrachloride. The saponification number of this oily material is about 185, the non-saponifiable matter constituting only about 4.4% of the oily extract. The iodine number is about 82 to 86. A considerable portion of the ground coffee is thus converted into a soap upon treatment with an alkali, as will be described more in detail below.

In carrying out the invention, the coffee beans or grounds are first brought to a finely comminuted condition, the particles being reduced to approximately colloidal size. This is best accomplished by grinding the fresh or used coffee grounds (or other preliminarily ground coffee bean material) with a fatty base in a suitable reducing machine, such as a colloid mill. I have found cocoa butter to be a very suitable material for this purpose, both because of its cheapness and because of its lubricating qualities, the cocoa butter also contributing to the fatty acid content of the mixture and thus to the production of the alkali metal or other soaps. The cocoa butter also contributes to the soft, smooth quality of the product. While part or even all of the cocoa butter might be replaced with roasted cocoa beans, preferably together with some fluid fatty material to aid in the reduction, best results are obtained by the use of cocoa butter itself.

The grinding of the coffee bean material and the cocoa butter yields a colloidal paste which may then be mixed with coconut oil or other fatty material commonly employed in the manufacture of soaps, after which the mixture is saponified, for example, with sodium or potassium hydroxide, or, if desired, with certain of the organic amines employed in the manufacture of special soaps, such as the mono-, di- and tri-ethanolamines.

An important advantage of the process outlined above is that it can be carried out in the cold, that is, at temperatures no higher than about 130° F. This involves a considerable saving in fuel and equipment. The soap can, however, be manufactured at the temperatures commonly employed in the soap industry.

The colloidal paste of coffee and cocoa butter will be dark in color, resembling the color of a tar soap when a highly roasted coffee bean (French roast) is used. As already indicated, lighter colors will be obtained with lightly roasted or unroasted beans.

The manufacture of my improved soap by a "cold" process will now be described in greater detail but it is to be understood that this procedure is presented purely by way of illustration and is not to be regarded as indicating the limits of the invention.

Ground roasted coffee beans or waste coffee grounds are mixed with 15 to 25% of their weight of cocoa butter after the latter has been melted. The mixture is fed to a colloidal mill and the grinding continued until a fine colloidal paste is obtained. 50 to 70 parts of this paste, heated to the fluid condition (120–130° F.) are mixed with 50 to 100 parts (all by weight) of coconut oil which has been heated to about 100–120° F., the mixture being stirred until it is uniform. To this mass, there are then added 50 to 75 parts of a solution of sodium hydroxide of 39° Bé. (about 34% of NaOH).

The addition of the alkali is preferably conducted in the following manner: First a part of the warmed coconut oil and part of the alkali solution are stirred into the coffee-cocoa butter paste, the mixing being continued until a uniform liquid is obtained. The rest of the oil and alkali solution are then poured in and the stirring continued, no external heat being applied.

When the mixture is uniform, it is poured into wooden molds and allowed to remain at room temperature for about 48 to 72 hours. Saponification takes place and at the same time the material hardens. Cakes or tablets of soap are thereby obtained which are quite hard at room temperature. The higher proportion of alkali in the range indicated above will yield a harder soap.

The soap is of satisfactory consistency even though the water and glycerine (the latter formed during the saponification) have not been removed. If a harder soap is desired, or if recovery of the glycerine is sought, the soap may be subjected to evaporation under vacuum, or to steam distillation, as will be understood by those skilled in the art.

The soap obtained in the manner just described resembles tar soap in appearance. It gives an abundant and at the same time heavy lather, and is thus more economical to use than light-lathering soaps, the lather removing dirt, grease and the like more rapidly than ordinary soaps and leaving the skin with a soft, velvety feel. The soap exerts a mild bleaching action on the skin which is doubtless due to certain of the ingredients of the coffee material, very probably to the tannic acid, at least in part.

The soap can be manufactured also by the hot process, for example, at temperatures of 220° F., the saponification being then considerably faster, the soap hardening on cooling. If desired, the glycerine can be recovered in any known or suitable way.

While coconut oil, palm-olive oil or even animal fats can be employed in place of all or part of the cocoa butter, I prefer to use the latter material as it blends in a very desirable way with the coffee material, combining with the latter to yield a soap stock from which a soap having the desirable qualities above described can easily be obtained. I prefer also to use only vegetable materials, although, as already indicated, some animal fats of the type commonly employed in soap manufacture may be used.

The soap of the present invention can be converted into various soap preparations like any other soap product. Thus it can be made into lotions, liquid soaps, powdered soaps, floating soaps and other known varities by procedures well-known in the art, including soap-containing creams of various kinds, including shaving and cleansing creams. The soap can be perfumed and other common additions can be added thereto. If a better grade of soap is desired, potassium hydroxide can be used in place of sodium hydroxide, as is well understood. As already mentioned, the extracted oils of the coffee material can be used in place of the whole bean substance for the manufacture of special toilet soaps; for ordinary toilet and laundry soaps, the whole bean material, including the fiber, has been found to be highly satisfactory.

While the coffee beans or grounds can be reduced to varying degrees of fineness, I prefer to grind it to the impalpable, more or less colloidal condition where it is to be used for toilet or laundry purposes. Where a more strongly abrasive soap is desired, as for use by auto mechanics, coarser grained coffee particles can be used.

Other variations from the specific conditions and proportions above described can be resorted to by those skilled in the art without departing from the spirit of the invention or scope of the appended claims.

I claim:

1. In a process for the manufacture of soap, the steps which comprise grinding coffee material with a fatty base to substantially colloidal fineness, and saponifying at least part of the fatty and oily content of the base and coffee material.

2. In a process for the manufacture of soap, the steps which comprise grinding coffee material with cocoa butter to substantially colloidal fineness, and saponifying at least part of the fatty and oily content of the cococa butter and coffee material.

3. A process as set forth in claim 1, wherein the coffee material is waste coffee grounds.

4. Process according to claim 2, wherein the weight of the cocoa butter is 15 to 25% of that of the coffee material.

5. In a process for the manufacture of soap, the steps which comprise grinding coffee material with a fatty base to substantially colloidal fineness, adding a vegetable oil thereto, and saponifying the mixture.

6. In a process for the manufacture of soap, the steps which comprise grinding coffee material with a fatty base to substantially colloidal fineness, adding coconut oil thereto, and saponifying the mixture.

7. Process for the manufacture of soap, comprising grinding coffee material with a fatty base, adding a vegetable oil thereto, treating the mixture with a solution of an alkali to effect at least partial saponification of the saponifiable content of the mixture, pouring the mass into molds and allowing the same to harden.

8. Process for the manufacture of soap, comprising melting cocoa butter, mixing coffee grounds therewith and grinding the same to a colloidal paste, mixing coconut oil therewith at a temperature of approximately 120° F., adding a quantity of strong sodium hydroxide solution sufficient to saponify the mixture and thereafter allowing the mass to harden.

9. A soap containing solid coffee bean material ground to substantially colloidal fineness and including the at least partially saponified oils of the beans, together with the protein, sugar, fiber and tannin content thereof.

10. A soap containing a saponified mixture of (1) 50 to 70 parts of coffee beans ground to a fine condition with 15 to 25% of its weight of cocoa butter, and (2) 50 to 100 parts of coconut oil, said soap containing the protein, sugar, fiber and tannin content of the beans as well as the unsaponifiable oils thereof.

11. A soap containing the alkali metal salts of coffee oil acids together with the protein, sugar, fiber and tannin content of the beans as well as the unsaponifiable oils thereof.

12. A soap comprising the saponified mixture of finely ground roasted coffee beans and a fatty material and containing the oil, protein and fiber content of the coffee beans.

13. A soap as defined in claim 12 wherein the coffee bean material is suspended in a mass of saponified cocoa butter.

ROBERT BROWN.